United States Patent
Kim et al.

(10) Patent No.: US 9,726,090 B2
(45) Date of Patent: Aug. 8, 2017

(54) ENGINE HAVING LOW PRESSURE EGR SYSTEM AND CONTROL METHOD THEREOF

(71) Applicant: HYUNDAI MOTOR COMPANY, Seoul (KR)

(72) Inventors: Seung Hwan Kim, Seoul (KR); Jong Il Park, Seoul (KR); Kwanhee Choi, Seoul (KR); Hyun Jun Lim, Incheon (KR); Joowon Lee, Gwangju-si (KR); Dong Hee Han, Seoul (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 78 days.

(21) Appl. No.: 14/943,940

(22) Filed: Nov. 17, 2015

(65) Prior Publication Data
US 2016/0326972 A1    Nov. 10, 2016

(30) Foreign Application Priority Data

May 7, 2015  (KR) ......................... 10-2015-0063763

(51) Int. Cl.
| | |
|---|---|
| *F01N 3/20* | (2006.01) |
| *F02B 37/20* | (2006.01) |
| *F02B 39/08* | (2006.01) |
| *F02D 41/00* | (2006.01) |
| *F02M 35/10* | (2006.01) |
| *F02D 41/12* | (2006.01) |

(Continued)

(52) U.S. Cl.
CPC ............ *F02D 41/0007* (2013.01); *F01N 3/20* (2013.01); *F02B 37/20* (2013.01); *F02B 39/08* (2013.01); *F02B 39/10* (2013.01); *F02D 41/005* (2013.01); *F02D 41/12* (2013.01); *F02M 26/06* (2016.02); *F02M 35/10157* (2013.01); *F02M 35/10222* (2013.01); *F02M 35/10268* (2013.01); *F02D 2041/0017* (2013.01)

(58) Field of Classification Search
CPC .... F02D 41/0007; F02D 41/12; F02D 41/005; F02D 2041/0017; F02B 37/20; F02B 39/08; F02B 39/10; F02M 35/10157; F02M 35/10222; F02M 35/10268; F02M 26/06; F01N 3/20
See application file for complete search history.

(56) References Cited

FOREIGN PATENT DOCUMENTS

| | | |
|---|---|---|
| JP | 2007-291973 | 11/2007 |
| JP | 2008-75589 | 4/2008 |

(Continued)

*Primary Examiner* — Mark Laurenzi
*Assistant Examiner* — Brandon Lee
(74) *Attorney, Agent, or Firm* — Brinks Gilson & Lione

(57) ABSTRACT

An engine having a low pressure EGR system includes: an intake line suctioning outdoor air and transferring the outdoor air to a combustion chamber; a turbocharger actuated by exhaust gas which flows in an exhaust line to compress gas which flows in the intake line; a supercharger installed at a downstream side of the turbocharger; a low pressure EGR line branched at one side of the exhaust line and joined to an upstream side of the turbocharger to recirculate the exhaust gas; a recirculation line branched on the intake line at a downstream side of the supercharger and joined to the intake line at an upstream side of a point where the low EGR line and the intake line meet; and a control unit controlling the actuation of the supercharger. The control unit actuates the supercharger in the case of a coasting driving condition.

14 Claims, 4 Drawing Sheets

(51) Int. Cl.
*F02B 39/10* (2006.01)
*F02M 26/06* (2016.01)

(56) References Cited

FOREIGN PATENT DOCUMENTS

| | | |
|---|---|---|
| JP | 2008-163794 A | 7/2008 |
| JP | 4746389 B | 8/2011 |
| KR | 10-2012-0140100 A | 12/2012 |
| KR | 10-2014-0108820 | 9/2014 |

ENGINE HAVING LOW PRESSURE EGR SYSTEM AND CONTROL METHOD THEREOF

CROSS-REFERENCE TO RELATED APPLICATION

This application claims the benefit of Korean Patent Application No. 10-2015-0063763, filed on May 7, 2015, which is incorporated herein by reference in its entirety.

FIELD

The present disclosure relates to an engine having a low pressure EGR system which improves combustion stability and reactivity of the engine by controlling recirculated exhaust gas.

BACKGROUND

The statements in this section merely provide background information related to the present disclosure and may not constitute prior art.

In general, an exhaust gas recirculation system is installed in most diesel engines and some gasoline engines which are installed in a vehicle to cope with regulations of exhaust gas.

The exhaust gas recirculation system returns some of exhaust gas discharged from the engine to an intake device of a cylinder to lower a combustion temperature of the engine to reduce a generation amount of nitrogen oxide (NOx), and reduce fuel consumption.

A low-pressure EGR apparatus adopts a scheme in which exhaust gas formed at a rear end of a particulate filter is cooled with an EGR cooler and is recirculated. Accordingly, since the low-pressure EGR apparatus is longer and lower in pressure than the existing high-pressure EGR apparatus and longer in flow path of the EGR gas, the low-pressure EGR apparatus cannot be stable in terms of responsiveness and controllability.

In addition, in an engine using a low pressure exhaust gas recirculation (LP EGR) technology, while the recirculated exhaust gas is used at a set ratio (e.g., 10 to 20%) with respect to air intake, when a vehicle is switched to a coasting drive mode according to an operation state, a throttle valve is closed and the recirculated exhaust gas remains between the throttle valve and an EGR valve.

We have discovered that combustion stability may deteriorate by the recirculated exhaust gas which remains in the coasting drive mode (accelerator pedal tip out) and engine hesitation can occur due to unstable combustion of the engine in reacceleration.

SUMMARY

The present disclosure provides an engine having a low pressure EGR system which can improve combustion stability and prevent hesitation while reacceleration by recirculating EGR gas charged between a turbocharger and an intake manifold to an upstream side of the turbocharger when a tip out condition is satisfied while an accelerator pedal is actuated.

An embodiment of the present disclosure provides an engine having a low pressure EGR system, including: an intake line suctioning outdoor air and transferring the outdoor air to a combustion chamber; a turbocharger actuated by exhaust gas which flows in an exhaust line to compress gas which flows in the intake line; a supercharger installed at a downstream side of the turbocharger; a low pressure EGR line branched at one side of the exhaust line and joined to an upstream side of the turbocharger from the intake line to recirculate the exhaust gas; a recirculation line branched on the intake line at a downstream side of the supercharger and joined to the intake line at an upstream side of a point where the low pressure EGR line and the intake line meet; and a control unit controlling the actuation of the supercharger, wherein the control unit actuates the supercharger in the case of a coasting driving condition.

The engine may further include a first catalyst unit disposed on the exhaust line to reduce the amount of a harmful substance included in the exhaust gas, wherein the low pressure EGR line is branched at a downstream side of the first catalyst unit to be connected to the intake line.

The engine may further include a control valve disposed between the point where the low pressure EGR line and the intake line meet and a point where the recirculation line and the intake line meet and controlling the flow of supplied gas.

The low pressure EGR line may include a low pressure EGR cooler cooling recirculated exhaust gas, and a low pressure EGR valve controlling the flow of the recirculated exhaust gas.

The engine may further include an intercooler disposed between the turbocharger and the electric supercharger to cool compressed gas compressed by the turbocharger.

The engine may further include a bypass line bypassing the electric supercharger and a bypass valve installed on the bypass line.

The engine may further include a recirculation valve controlling recirculated gas on the recirculation line, wherein the control unit opens the recirculation valve to circulate mixed gas when the coasting driving condition is reached.

The recirculation valve may be installed at a point where the recirculation line is branched from the intake line.

The engine may further include a second catalyst unit installed at a downstream side of the first catalyst unit to reduce a harmful substance included in the exhaust gas, wherein the low pressure EGR line is branched from the exhaust line between the first catalyst unit and the second catalyst unit.

An air cleaner filtering foreign substances included in outdoor air may be disposed at an upstream side and the recirculation line may join in the intake line between the control valve and the air cleaner.

A throttle valve controlling the gas supplied to the combustion chamber may be disposed at a downstream side of the point where the intake line and the recirculation line are branched.

Another embodiment of the present disclosure provides a control method of an engine including: an intake line suctioning outdoor air and transferring the outdoor air to a combustion chamber; a turbocharger actuated by exhaust gas which flows in an exhaust line to compress gas which flows in the intake line; a supercharger installed at a downstream side of the turbocharger; a low pressure EGR line branched at one side of the exhaust line and joined to an upstream side of the turbocharger to recirculate the exhaust gas; a recirculation line branched on the intake line at a downstream side of the supercharger and joined to the intake line at an upstream side of a point where the low EGR line and the intake line meet; a throttle valve, a vehicle speed sensor; and an accelerator pedal sensor disposed in the rear of the supercharger; and a control unit controlling operations of the supercharger, the throttle valve, the low pressure EGR valve, and the recirculation valve by receiving output signals of the throttle valve and the vehicle speed sensor, wherein the control unit determines that a coasting driving condition is reached according to the signals of the throttle valve and the vehicle speed sensor and when the coasting driving condition is reached, the control unit controls the throttle valve to be closed, the recirculation valve to be opened, and the turbocharger to be actuated.

The engine may further include a recirculation valve provided on the recirculation line, and the control unit may control the recirculation valve to be closed in the case of the coasting driving condition.

The engine may further include a first catalyst unit disposed at one side of the exhaust line to reduce a harmful substance included in the exhaust gas, and the low pressure EGR line may be branched at a downstream side of the first catalyst unit to be connected to the intake line.

According to embodiments of the present disclosure, when a tip out condition is satisfied while EGR gas is recirculated, mixed gas is recirculated to an upstream side of an intake line from a downstream side of an electric supercharger through a recirculation line to increase the amount of fresh air supplied to a combustion chamber and reduce the amount of EGR gas, thereby improving combustion stability of the combustion chamber.

Moreover, when an accelerator pedal is actuated again in a tip out condition, the amount of the fresh air supplied to the engine increases, and as a result, the combustion stability can be improved and engine hesitation can be prevented.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
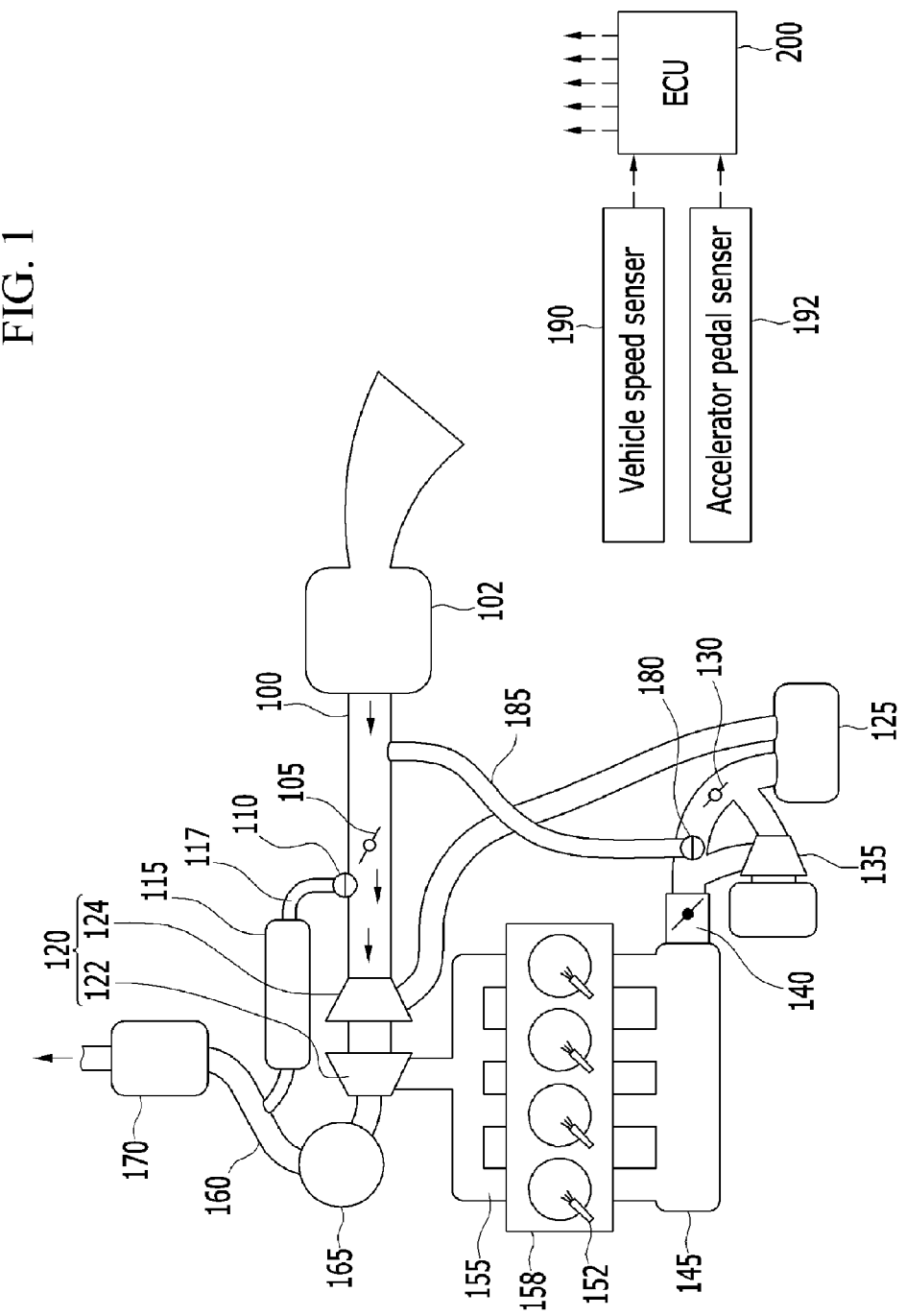
FIG. 1 is a configuration diagram of a low pressure EGR system according to an embodiment of the present disclosure.

The drawings described herein are for illustration purposes only and are not intended to limit the scope of the present disclosure in any way.

DESCRIPTION OF SYMBOLS

100: Intake line 102: Air cleaner
105: Control valve 110: EGR valve
115: EGR cooler 117: EGR line
120: Turbocharger 122: Turbine
124: Compressor 125: Intercooler
130: Bypass valve 135: Supercharger
140: Throttle valve 145: Intake manifold
150: Block 152: Injector
155: Exhaust manifold 160: Exhaust line
165: First catalyst unit 170: Second catalyst unit
180: Recirculation 185: Recirculation line
190: Accelerator pedal sensor 192: vehicle speed sensor
200: Control unit

DETAILED DESCRIPTION

The following description is merely exemplary in nature and is not intended to limit the present disclosure, application, or uses. It should be understood that throughout the drawings, corresponding reference numerals indicate like or corresponding parts and features.

FIG. 1 is a configuration diagram of an engine having a low pressure EGR according to an embodiment of the present disclosure.

Referring to FIG. 1, the engine includes an air cleaner 102, an intake line 100, a control valve 105, a low pressure EGR valve 110, a low pressure EGR line 117, a low pressure EGR cooler 115, a turbocharger 120, a turbine 122, a compressor 124, a second catalyst unit 170, an exhaust line 160, a first catalyst unit 165, an exhaust manifold 155, an engine block 150, an injector 152, an intake manifold 145, a throttle valve 140, an electric supercharger 135, an intercooler 125, a recirculation line 185, a recirculation valve 180, a bypass valve 130, and a control unit 200.

Fresh air passing through the air cleaner 102 sequentially passes through the control valve 105 in the intake line 100, the compressor 124, and the intercooler 125 and passes through the bypass valve 130 or the electric supercharger 135 and thereafter, is supplied to the intake manifold 145 through the throttle valve 140.

The fresh air is distributed from the intake manifold 145 to a combustion chamber formed in the block 150 and fuel is injected from the injector 152 disposed in each combustion chamber.

Combusted gas is discharged to the outside through the exhaust manifold 155, the turbine 122, the first catalyst unit 165, and the second catalyst unit 170.

Some of the exhaust gas passing through the first catalyst unit 165 sequentially passes through the low pressure EGR cooler 115 and the low pressure EGR valve 110 installed in the low voltage EGR line 117 and is mixed with the fresh air that passes through the intake line 100 to be supplied to the combustion chamber.

The low pressure EGR line 117 is branched from the exhaust line 160 between the first catalyst unit 165 and the second catalyst unit 170 to be joined to the intake line 100 between the compressor 124 and the control valve 105.

Moreover, the electric supercharger 135 is disposed at a downstream side of the intercooler 125 and the bypass valve 130 is installed on a bypass line bypassing the electric supercharger 135.

The recirculation line 185 is branched from the intake line 100 at the downstream side of the electric supercharger 135 and is connected to the intake line 100 at the upstream side of the control valve 105 and the recirculation valve 180 is disposed in the recirculation line 185 to control the flow of the recirculated gas.

The control unit 200 may control operations of the control valve 105, the low pressure EGR valve 110, the bypass valve 130, the electric supercharger 135, the throttle valve 140, the injector 152, and the recirculation valve 180 according to output signals of a vehicle speed sensor 192 and an accelerator pedal sensor 190.

In the embodiment of the present disclosure, while an accelerator pedal is actuated according to a driving condition, the EGR gas is recirculated through the low pressure EGR line 117 and the turbocharger 120 and the electric supercharger 135 are selectively actuated.

In addition, in a tip out condition in which a foot is removed from the accelerator pedal, the throttle valve 140 is closed and the fresh air and the EGR gas are mixed between the low pressure EGR valve 110 and the supercharger 135.

In this case, the control unit 200 controls the recirculation valve 180 to be opened and mixed gas of the fresh air and the EGR gas is recirculated to the upstream side of the control valve 105 through the recirculation line 185 by actuating the electric supercharger 135. As a result, the mixed gas charged between the low pressure EGR valve 110 and the electric supercharger 135 decreases and a ratio of the fresh air increases.

Therefore, when the tip out condition is satisfied while EGR gas is recirculated, the mixed gas is recirculated to the upstream side of the intake line 100 through the recirculation line 185 to increase the amount of the fresh air supplied to the combustion chamber and decrease the amount of the EGR gas, thereby improving combustion stability of the combustion chamber.

The control unit 200 may be provided as one or more microprocessors that operate by a set program and the set program may include a series of commands for performing a method according to an embodiment of the present disclosure to be described below.

Figure 2:
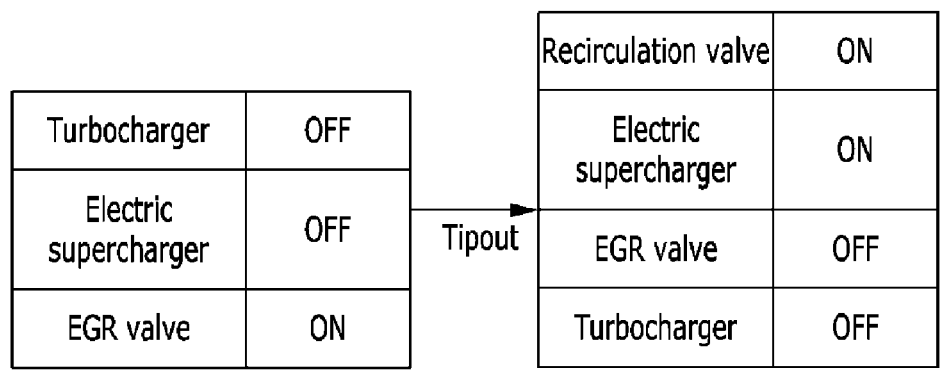
FIG. 2 is a table showing a first state of an actuating component in the low pressure EGR system according to the embodiment of the present disclosure.

FIG. 2 is a table showing a first state of an actuating component in the low pressure EGR system according to the present disclosure.

Referring to FIG. 2, in a first driving state, the turbocharger 120 is turned off, the electric supercharger 135 is turned off, and the EGR valve 110 is turned on.

In the first driving state, a driver steps on the accelerator pedal, the turbocharger 120 rotates at a set speed or less to be turned off, the electric supercharger 135 is turned off, and the EGR gas is supplied by the EGR valve 110, and the recirculation valve 180 is closed.

the first state, when the control unit 200 determines that a current state as a state in which the driver does not step on the accelerator pedal, that is, a tip out state, the control unit 200 closes the throttle valve 140, opens the recirculation valve 180, and actuates the electric supercharger 135 to recirculate the mixed gas charged at the upstream side of the throttle valve 140 to the upstream side of the control valve 105. Herein, the EGR vale 110 is closed and the turbocharger 120 rotates at the set speed or less to be turned off.

Figure 3:
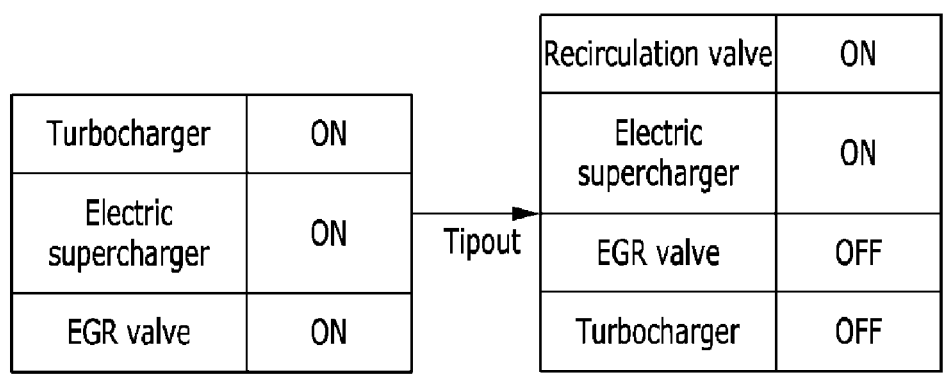
FIG. 3 is a table showing a second state of the actuating component in the low pressure EGR system according to the embodiment of the present disclosure.

FIG. 3 is a table showing a second state of the actuating component in the low pressure EGR system according to an embodiment of the present disclosure.

Referring to FIG. 3, in a second driving state, the driver steps on the accelerator pedal, the turbocharger 120 rotates at the set speed or more to be turned on, the electric supercharger 135 is actuated, and the EGR gas is supplied by the EGR valve 110, and the recirculation valve 180 is closed.

In the second state, when the control unit 200 determines that the current state as a state in which the driver does not step on the accelerator pedal, that is, the tip out state, the control unit 200 closes the throttle valve 140 and opens the recirculation valve 180 to recirculate the mixed gas charged at the upstream side of the throttle valve 140 to the upstream side of the control valve 105 by the electric supercharger 135. Herein, the EGR valve 110 is closed and the turbocharger 120 rotates at the set speed or less to be turned off.

Figure 4:
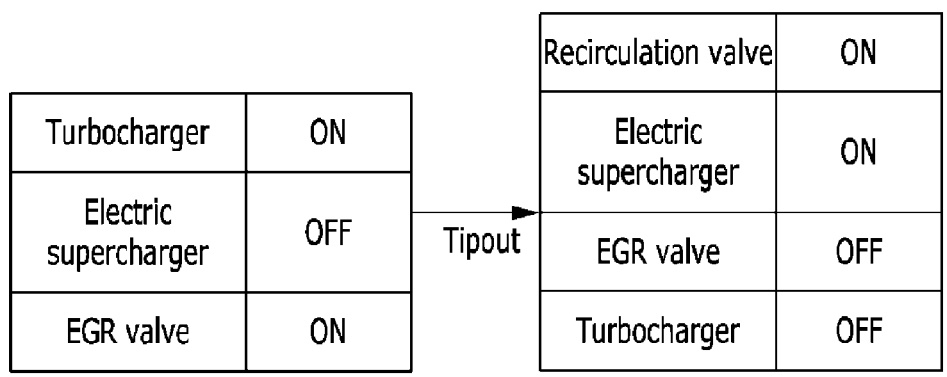
FIG. 4 is a table showing a third state of the actuating component in the low pressure EGR system according to the embodiment of the present disclosure.

FIG. 4 is a table showing a third state of the actuating component in the low pressure EGR system according to the embodiment of the present disclosure.

Referring to FIG. 4, in a third driving state, the driver steps on the accelerator pedal, the turbocharger 120 rotates at the set speed or more to be turned on, the electric supercharger 135 is turned off, and the EGR gas is supplied by the EGR valve 110, and the recirculation valve 180 is closed.

In the third state, when the control unit 200 determines that a current state as a state in which the driver does not step on the accelerator pedal, that is, the tip out state, the control unit 200 closes the throttle valve 140, opens the recirculation valve 180, and actuates the electric supercharger 135 to recirculate the mixed gas charged at the upstream side of the throttle valve 140 to the upstream side of the control valve 105. Herein, the EGR vale 110 is closed and the turbocharger 120 rotates at the set speed or less to be turned off.

In the embodiment of the present disclosure, it is described that when the tip out condition is satisfied, the recirculation valve 180 is opened and the supercharger 135 is actuated to recirculate the mixed gas through the recirculation line 185, but when it is determined that the current driving condition is a coasting driving condition according to a driving state of the engine besides the tip out condition, the recirculation valve 180 is opened and the supercharger 135 is actuated to recirculate the mixed gas to the upstream side of the intake line 100.

While this present disclosure has been described in connection with what is presently considered to be practical embodiments, it is to be understood that the present disclosure is not limited to the disclosed embodiments, but, on the contrary, is intended to cover various modifications and equivalent arrangements included within the spirit and scope of the appended claims.

What is claimed is:

1. An engine including a low pressure EGR system, comprising:
    an intake line configured to suction an outdoor air and transfer the outdoor air to a combustion chamber;
    a turbocharger actuated by an exhaust gas which flows in an exhaust line and configured to compress gas which flows in an intake line;
    a supercharger installed at a downstream side of the turbocharger;
    a low pressure EGR line branched at one side of the exhaust line and joined to an upstream side of the turbocharger from the intake line to recirculate the exhaust gas;
    a recirculation line branched on the intake line at a downstream side of the supercharger and joined to the intake line at an upstream side of a point where the low pressure EGR line and the intake line meet; and
    a control unit configured to control an actuation of the supercharger,
    wherein the control unit is configured to actuate the supercharger under a coasting driving condition.

2. The engine of claim 1, further comprising:
    a first catalyst unit disposed on the exhaust line to reduce an amount of a harmful substance included in the exhaust gas,
    wherein the low pressure EGR line is branched at a downstream side of the first catalyst unit to be connected to the intake line.

3. The engine of claim 2, further comprising:
    a second catalyst unit installed at a downstream side of the first catalyst unit and configured to reduce the harmful substance included in the exhaust gas, wherein the low pressure EGR line is branched from the exhaust line between the first catalyst unit and the second catalyst unit.

4. The engine of claim 1, further comprising:
a control valve disposed between the point where the low pressure EGR line and the intake line meet and a point where the recirculation line and the intake line meet and controlling a flow of supplied gas.

5. The engine of claim 4, wherein an air cleaner configured to filter foreign substances included in outdoor air is disposed at an upstream side of the intake line, and the recirculation line joins in the intake line between the control valve and the air cleaner.

6. The engine of claim 1, wherein the low pressure EGR line comprises
a low pressure EGR cooler configured to cool the recirculated exhaust gas; and
a low pressure EGR valve configured to control a flow of the recirculated exhaust gas.

7. The engine of claim 1, further comprising an intercooler disposed between the turbocharger and the supercharger, the intercooler configured to cool the gas compressed by the turbocharger.

8. The engine of claim 1, further comprising a bypass line bypassing the supercharger and a bypass valve installed on the bypass line.

9. The engine of claim 1, further comprising a recirculation valve configured to control a recirculated gas on the recirculation line,
wherein the control unit is configured to open the recirculation valve to circulate a mixed gas when the coasting driving condition is reached.

10. The engine of claim 9, wherein the recirculation valve is installed at a point where the recirculation line is branched from the intake line.

11. The engine of claim 1, wherein a throttle valve configured to control a gas supplied to the combustion chamber is disposed at a downstream side of the point where the intake line and the recirculation line are branched.

12. A control method of an engine, the engine including:
an intake line configured to suction an outdoor air and transfer the outdoor air to a combustion chamber;
a turbocharger actuated by an exhaust gas which flows in an exhaust line and configured to compress gas which flows in the intake line;
a supercharger installed at a downstream side of the turbocharger;
a low pressure EGR line branched at one side of the exhaust line and joined to an upstream side of the turbocharger to recirculate the exhaust gas;
a recirculation line branched on the intake line at a downstream side of the supercharger and joined to the intake line at an upstream side of a point where the low EGR line and the intake line meet;
a throttle valve;
a vehicle speed sensor;
an accelerator pedal sensor disposed in rear of the supercharger; and
a control unit configured to control operations of the supercharger, the throttle valve, the low pressure EGR valve, and a recirculation valve by receiving output signals of the throttle valve and the vehicle speed sensor,
the method comprising:
determining by the control unit whether a coasting driving condition is reached according to the signals of the throttle valve and the vehicle speed sensor; and
controlling by the control unit the throttle valve to be closed, the recirculation valve to be opened, and the turbocharger to be actuated when the coasting driving condition is reached.

13. The method of claim 12, wherein the recirculation valve of the engine is provided on the recirculation line, and the control unit is configured to control the recircuation valve to be closed under a coasting driving condition.

14. The method of claim 13, wherein a first catalyst unit disposed at one side of the exhaust line to reduce a harmful substance included in the exhaust gas, and the low pressure EGR line is branched at a downstream side of the first catalyst unit to be connected to the intake line.

* * * * *